United States Patent [19]
Koch et al.

[11] 3,976,095
[45] Aug. 24, 1976

[54] OPERATING MEMBER LOCKING DEVICE

[75] Inventors: Ulrich H. Koch, Moraga; Thomas A. Voudy, San Pablo, both of Calif.

[73] Assignee: Whitey Research Tool Co., Emeryville, Calif.

[22] Filed: June 9, 1975

[21] Appl. No.: 584,717

[52] U.S. Cl.................................. 137/385; 251/104
[51] Int. Cl.².......................................... F16K 35/06
[58] Field of Search..................... 137/385; 251/104

[56] References Cited
UNITED STATES PATENTS

| | | |
|---|---|---|
| 1,238,073 | 8/1917 | Hollar.......................... 137/385 X |
| 3,200,836 | 8/1965 | Trefil et al........................ 137/385 |
| 3,648,970 | 3/1972 | Hartmann et al.............. 137/385 X |
| 3,865,130 | 2/1975 | Mullis................................ 137/385 |

*Primary Examiner*—Henry T. Klinksiek
*Attorney, Agent, or Firm*—Fay & Sharpe

[57] ABSTRACT

In a device of the type having a rotatable operating member for purposes of selective adjustment thereof, a locking structure for selectively locking the device in predetermined positions. The locking structure has a lock plate affixed to the device and includes a locking portion therein. A separate lock tab member is closely received on the operating member and has a tab portion including a third locking hole which will register with one of the first and second locking holes when the operating member is moved to the predetermined positions in order that a locking member may then be passed through the aligned locking holes. Stop members included on the lock tab coact with the device itself to define the extreme rotated positions of the operating member. A handle is closely received over the operating member for conveniently rotating the member and advantageously extends in generally the opposite direction from the tab portion of the lock tab.

15 Claims, 9 Drawing Figures

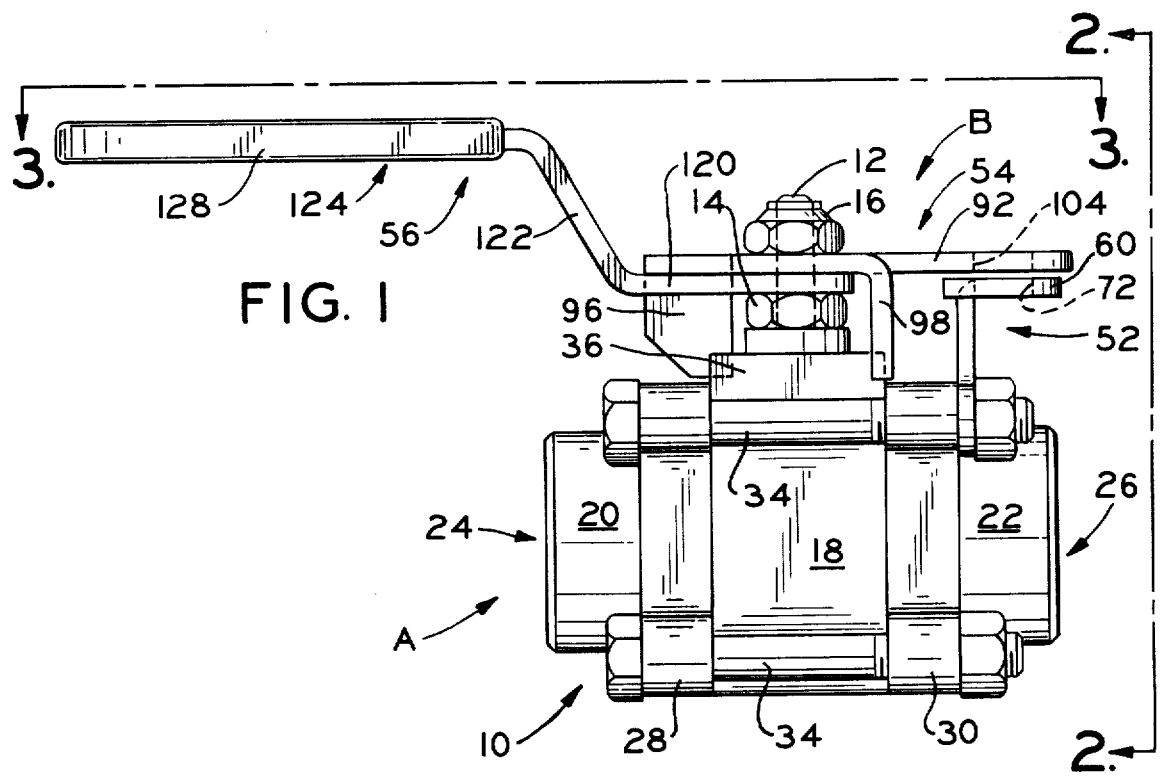
FIG. 1
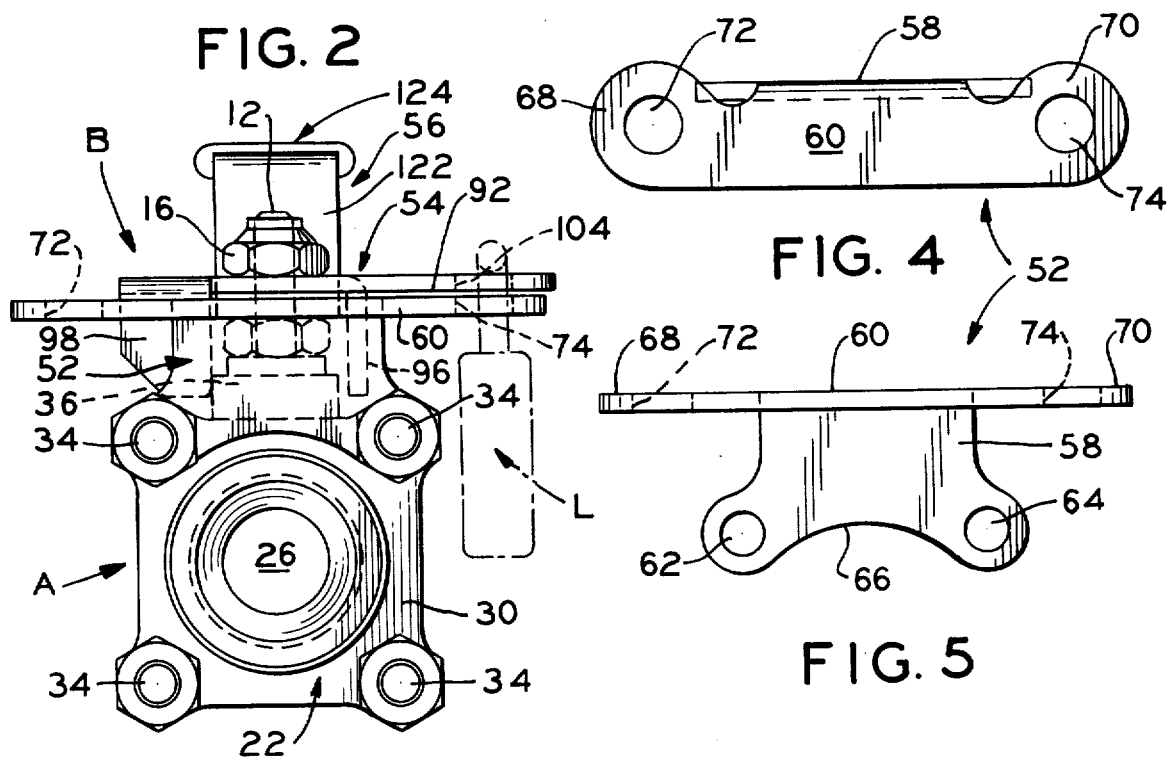
FIG. 2
FIG. 4
FIG. 5

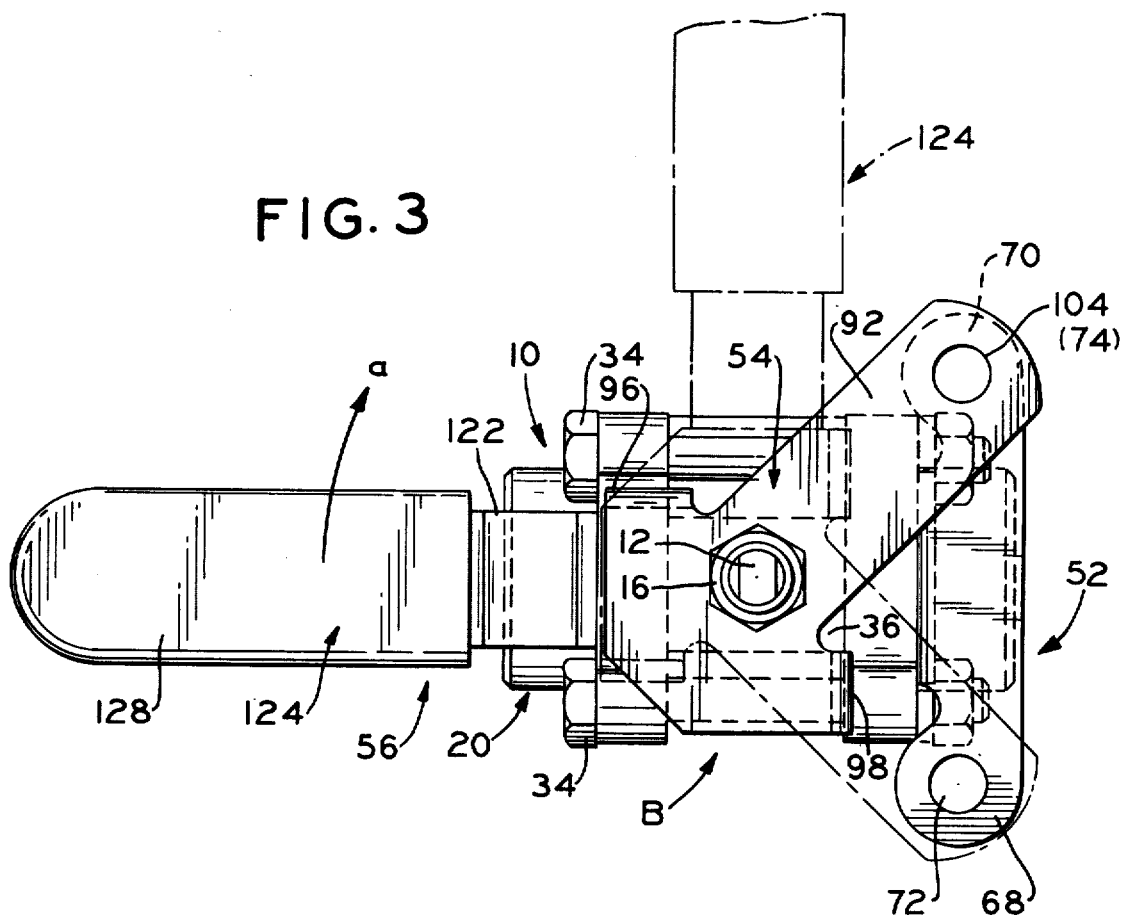
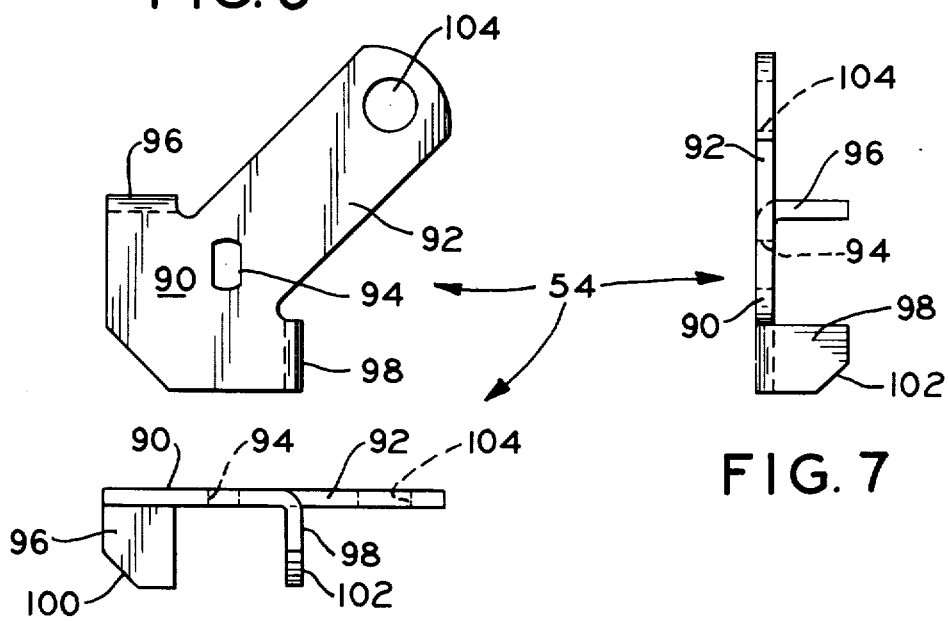

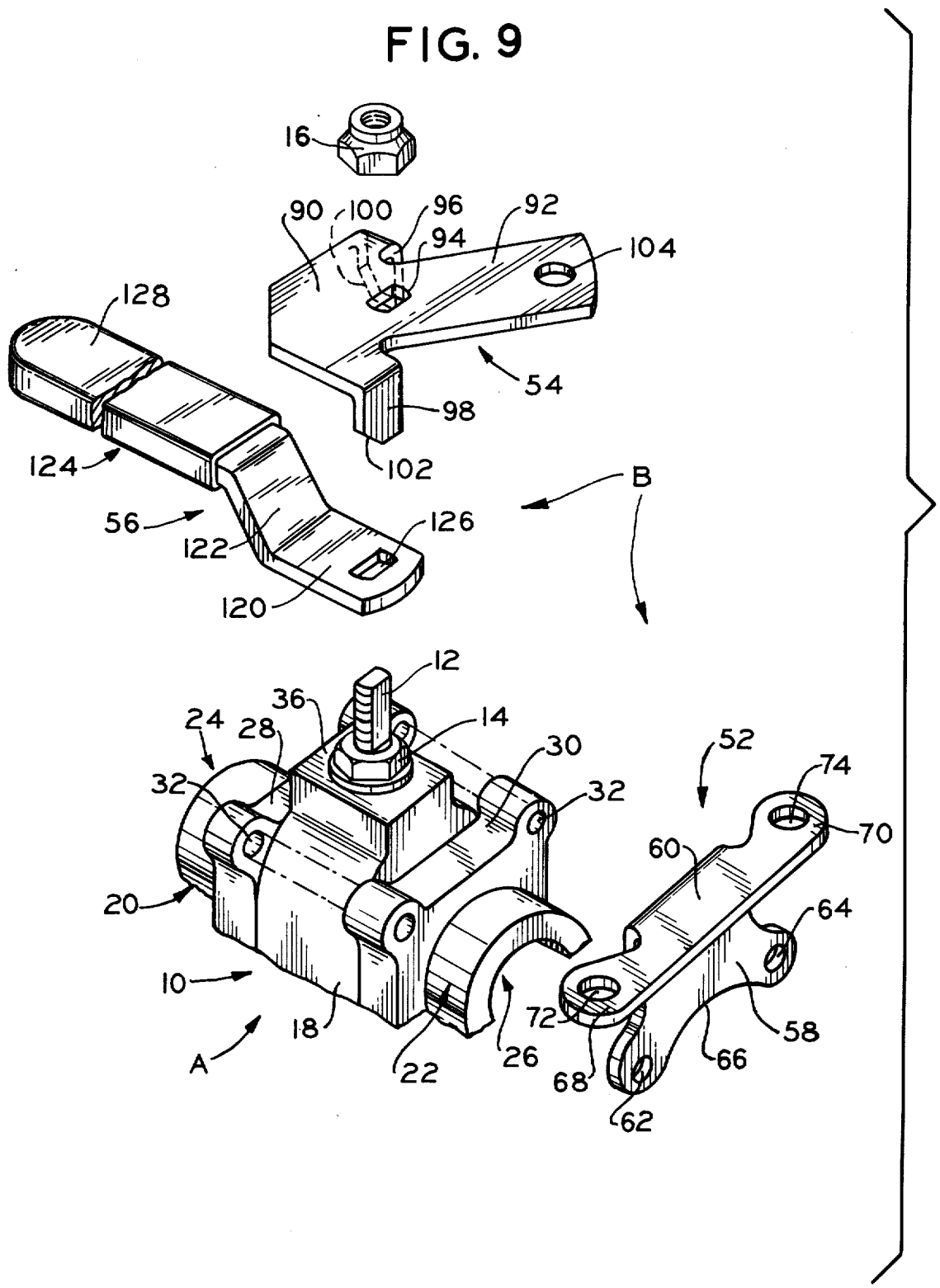

OPERATING MEMBER LOCKING DEVICE

BACKGROUND OF THE INVENTION

This invention pertains to the art of locking structures and more particularly to locking structures for devices which have an operating member rotatable between a pair of extreme positions.

The invention is particularly applicable to valves and the like and will be described with particular reference to ball valves; however, it will be appreciated by those skilled in the art that the invention has broader applications and is equally applicable to other structures and environments.

Locking structures for valves and the like are deemed desirable in many applications and environments where, for example, the valve is hidden from view or located in a remote area where it cannot be constantly checked by operating personnel. Thus, it is oftentimes desired to open or close a valve and have subsequent assurance that the valve will remain in that condition and not be either inadvertently or intentionally altered from the desired condition. Locking devices, while deemed only desirable in some circumstances, are considered necessary and highly advisable in other circumstances. For example, in some circumstances or applications, the nature of the liquid or fluid flowing through a system could cause damage to the system or surrounding environment if a valve within the system was opened or closed at the wrong time.

Locking devices particularly applicable to valves and the like are known in the art. However, most of these prior devices have not been universally acceptable because of their overall complexity with resultant overall difficulty of manufacture. In addition, and because of the nature of the design of such prior locking structures, their costs when utilizing them on a substantial number of individual valves or the like, oftentimes became prohibitive. Further, many prior locking structure designs were cumbersome and presented difficulties when attempting to incorporate them into actual use.

Accordingly, it has been desired to develop a locking structure for valves or the like which is simple in design, easy and inexpensive to manufacture, easy to adopt to practical application and which is readily adaptable for use in any number of applications and/or environments. The present invention contemplates a new and improved locking structure which is deemed to successfully meet these requirements and overcome all of the above referred to problems and others normally associated with prior locking structures.

BRIEF DESCRIPTION OF THE PRESENT INVENTION

In accordance with the present invention, there is provided a locking structure for controlling apparatus of the type having an operating member protruding outwardly from the apparatus housing wherein the operating member is rotatable relative to the housing between two extreme positions for adjusting the apparatus. The locking structure comprises a lock plate having a mounting portion and a locking portion with the lock plate being mounted to the apparatus housing by the mounting portion and the locking portion disposed in a plane generally normal to the longitudinal axis of the operating member. The locking portion has at least first and second spaced apart locking holes therein. A lock tab having a body portion and a tab portion is adapted to be closely received on the operating member. The tab portion extends outwardly of the body portion in a plane generally parallel and closely spaced to the plane of the lock plate locking portion and includes a third locking hole therein. The third locking hole is adapted for selective registry with the first and second locking holes in order that a locking member may be passed through one of the combinations of the third and first and the third and second locking holes for locking the operating member in a particular position. The locking structure also includes a handle received on the operating member for selectively rotating the member between the two extreme positions.

In accordance with another aspect of the present invention, the first and second locking holes are spaced apart such that registry with the third locking hole in the tab portion occurs at the extreme positions of the operating member.

In accordance with still another aspect of the present invention, the body portion of the lock tab includes a pair of spaced apart downwardly depending stop members with one of the pair engaging the apparatus at one extreme position of the operating member and the other of the pair engaging the apparatus at the other extreme position of the operating member.

The principal object of the present invention is the provision of a new operating member locking device which is simple in design.

Another object of the present invention is the provision of a new operating member locking device which is easy and inexpensive to manufacture.

Another object of the present invention is the provision of a new operating member locking device which is easy to install for practical application and use.

Still another object of the present invention is the provision of a new operating member locking device which is readily adapted to use in any number of operational environments where such operating member controlled devices are employed.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 is a side elevational view of a ball valve having the locking device of the subject invention installed thereon;

FIG. 2 is an end view in the direction of lines 2—2 in FIG. 1;

FIG. 3 is a plan view in the direction of lines 3—3 in FIG. 1;

FIG. 4 is a plan view of the lock plate used in the subject locking device;

FIG. 5 is a front view of the locking plate shown in FIG 4;

FIG. 6 is a plan view of the lock tab used in the subject locking device;

FIG. 7 is one side view of the lock tab shown in FIG. 6;

FIG. 8 is another side view of the lock tab shown in FIG. 6; and,

FIG. 9 is a exploded perspective view showing the relative positioning of the components which comprise the subject locking device.

DESCRIPTION OF THE PREFERRED EMBODIMENT

Referring now to the drawings wherein the showings are for purposes of illustrating the preferred embodiment of the invention only and not for purposes of limiting same, th FIGS. show a valve A and an operating handle locking device B.

Valve A is shown for purposes of merely illustrating the invention only and could comprise any valve or other device controlled by an operating member rotated between controlling positions. However, as disclosed herein, this valve comprises a ball valve 10 having a valve operating member or stem 12 protruding outwardly from the valve body. A packing nut 14 and a handle nut 16 are threadedly received on the valve operating member or stem with a portion of the operating handle locking device B tightly disposed between nuts 14, 16.

The body of ball valve 10 is comprised of a central portion 18 and two opposed end portions 20, 22. Fluid is passed through the valve between these end portions at fluid openings or ports 24, 26 which, of course, are normally affixed to or placed within the fluid system which is to be controlled. End portions 20, 22 also each include end flanges 28, 30 each having a plurality of aligned openings 32 therein adapted to receive a plurality of nut and bolt assemblies generally designated 34. In a valve here under discussion, four such assemblies 34 are employed and tightened in order that central portion 18 will be tightly clamped between end portions 20, 22.

The general type of valve structure defined is deemed to be known in the art so that further elaboration thereon is deemed unnecessary. In the valve shown in the FIGS., however, a longitudinal rib 36 extends upwardly from the top surface of central portion 18. This rib defines stops for purposes of determining the extreme points of rotation for the valve operating handle as will be described in greater detail hereinafter.

Operating member locking device B, in the preferred embodiment, generally comprises two, separate component parts, namely, a lock plate 54 and a lock tab 52. In addition, a handle 56 is provided for purposes of turning the stem for controlling the valve. The lock plate itself is comprised of a mounting portion 58 and a locking portion 60. While any of a number of different materials could be employed, it is preferred to have the lock plate constructed from sheet metal. This material facilitates the lock plate having the necessary rigidity and strength while allowing it to be manufactured by conventional metal working techniques such as stamping and forming. Of course, other materials could also be advantageously employed without departing from the intent or scope of the present invention.

As best shown in FIGS. 4, 5 and 9, mounting portion 58 and locking portion 60 are disposed in planes generally normal to each other in order that the mounting portion will be disposed in a plane generally normal to the longitudinal axis of operating member or stem 12. The reasons for this will become readily apparent hereinafter. The mounting portion is slightly elongated adjacent the bottom end and includes a pair of mounting holes 62, 64 adjacent the outermost edges therof. These mounting holes are dimensioned and spaced apart from each other in order that they may be received on the uppermost pair of nut and bolt assemblies 34 to thereby be rigidly retained on the valve body against outwardly exposed face of flange 30. When so mounted, the plane of locking portion 60 is generally normal to the longitudinal axis of stem 12. An inwardly extending arcuate area 66 is included between these two mounting holes for purposes of providing clearance for the top circular area of end portion 22.

Locking portion 60 is also slightly elongated and includes what are termed locking ears 68, 70 adjacent the outermost ends thereof. Within the confines of these ears are included a pair of locking holes 72, 74 which are employed in combination with lock tab 54 for purposes of locking the valve in either one of two positions. In the preferred embodiment and for reasons which will become apparent hereinafter, locking holes 72, 74 are spaced apart from each other a distance so that when the operating member is placed in either of two extreme positions, the lock tab will be aligned with one of them. This aspect of the subject invention will be described in detail hereinbelow but it should be noted here that the spacing between the two locking holes 72, 74 is deemed critical for this purpose. It is possible for alternative arrangements for use in other apparatus in different environments to have either a greater or lesser number of locking holes and to have them spaced apart in different relationships than that described above. Further, it is possible to include convenient indicia on, for example, locking portion 60 for purposes of indicating the particular flow position of the valve as determined by the position of the operating member.

As best shown in FIGS. 6, 7, 8 and 9, lock tab 54 is comprised of a base portion generally designated 90 and a tab portion generally designated 92. Disposed in the base portion is an operating member or stem mounting hole 94 dimensioned so that the lock tab will be closely received over the stem. As will be noted in the Figures, mounting opening 94 is not symmetrical but rather, is elongated and includes opposed arcuate end walls and opposed straight side walls. The side walls are adapted to be relatively closely received on adjacent opposed flats included on stem 12 to prevent relative rotation between the handle and stem. This type of configuration, including the stem flats, is deemed to be known in the art so that further elaboration thereon is not necessary.

Depending downwardly from base portion 90 are a pair of stops or tabs generally designated 96, 98, each having an angled or beveled lower corner 100, 102, respectively. In the preferred arrangement here under discussion, stops or tabs 96, 98 merely comprise bent members formed integrally with lock tab 54 and are disposed relative to each other such that the handle and operating stem will be limited to 90° of rotation before one of the stops engages a portion of the valve body or cooperative body stops. This feature will be described in greater detail hereinafter. While the lines of bend between stops or tabs 96, 98 as shown in the Figures are generally normal to each other, it should be appreciated that the bends may be located on base portion 90 at other positions relative to each other for purposes of accommodating other valve designs or alternative uses of the operating handle locking device as might be deemed necessary or advantageous.

Tab portion 92 extends outwardly from and in the same plane as base portion 90. Disposed adjacent the outermost end of the tab portion is a locking hole 104 adapted for registry with locking holes 72, 74 of locking portion 60 of lock plate 52. In the preferred arrangement, tab portion 92 extends outwardly from the base portion at an angle which bisects the bends or axes of bends of stops or tabs 96, 98 when the axes are extended outwardly from the tabs to intersect with each other. This particular design is deemed advantageous in the overall effective use and operation of the subject locking device. That is, it provides that a minimum of the locking device component parts will protrude outwardly from valve 10 body to any great degree.

As with lock plate 52, lock tab 54 is preferably constructed from a sheet metal. This material is deemed to provide the necessary strength and rigidity for the structure while lending itself to manufacture by conventional, inexpensive metal working techniques. To this end, the entire lock tab structure may be constructed from a single piece of material; however, if deemed advantageous or necessary, the lock tab could be constructed from other materials. Also, if desired, it is possible to include indicia on the lock plate at, for example, base portion 90 for purposes of indicating the operating position of the valve.

With particular reference to FIGS. 1 and 9, handle 56 is shown as being comprised of a base portion 120 merging to an intermediate portion 122 which angles upwardly from the base portion. The intermediate portion then merges into a gripping portion 124 which extends outwardly therefrom in a plane generally parallel to the plane of base portion 120. The base portion includes a mounting opening 126 (FIG. 9) which is similarly dimensioned to mounting opening 94 in base portion 90 of lock tab 54. Again, the configuration employed prevents relative rotation between the handle and operating member or stem 12. The handle is configured so that gripping portion 124 extends in generally the opposite direction from tab portion 92 of lock tab 54 in order to eliminate any interference with the locking action of the locking device. In addition, at least gripping portion 124 may be conveniently covered with a vinyl plastic or other insulating material 128 to a preferred thickness of generally in the range of 1/16''. By varying the color of the vinyl coating from valve to valve in a complex system, each valve may be coded to indicate what fluid it controls.

In the preferred arrangement, handle 56 comprises a one piece sheet metal stamping for purposes of maintaining production costs at a minimum. However, as is apparent, the handle may be constructed from any number of other materials using other manufacturing techniques without departing from the intent and scope of the present invention. It is also entirely possible to vary the specific handle design from that specifically shown herein for purposes of accommodating various requirements for particular installations. In some situations, it may also be desirable to construct lock tab 54 and handle 56 as a single integral member.

With the above described components in their relative positions as shown in FIG. 9 and in the assembled condition as shown in FIGS. 1, 2 and 3, description will hereinafter be made with regard to use of the subject operating member locking device. The handle 56 and lock tab 54 are closely tightly received between packing nut 14 and handle nut 16 so that there is no relative rotation between the parts and the operating member or stem 12. In this mounted position and as shown in FIGS. 1 and 2, the upper planar surface of locking portion 60 is closely spaced and parallel to the lower planar surface of tab portion 92. In the position of the valve shown in the Figures, locking hole 104 in tab portion 92 is in registry with locking hole 74 of locking portion 60. In this condition, stop or tab 98 engages one side of longitudinal rib 36 to positively establish one extreme position for the operating member or stem. It should be noted that in this position, the area or axis of bend for stop 98 is generally normal to the plane of that portion of longitudinal rib 36 that it engages. See FIGS. 1 and 3 in this regard. This arrangement is deemed advisable since when turning pressure is applied through the handle against stop 98, the tab will not have a tendency to unbend from its normally downwardly depending position. With the locking device in the position just described, a padlock or other convenient locking means L in FIG. 2 may be installed through aligned openings 104, 74 for purposes of locking the valve in that particular position. In the preferred ball valve arrangement shown in the Figures, the position shown is the valve opened position.

When it is desired to close the valve, it is merely necessary to remove the padlock or other locking device L from openings 104, 74, turn the operating member through handle 56 in direction a of FIG. 3 to the position shown in phantom where the leading edge of stop or tab 96 engages the other side of longitudinal rib 34 similar to that hereinabove described with reference to tab 98. Lock plate 52 and lock tab 54 are dimensioned such that when stop 96 engages the longitudinal rib, locking hole 104 in tab portion 92 will be in registry or alignment with locking hole 72 in locking portion 60. In this position, the valve is in the closed condition. As before, a padlock or other locking device may be conveniently passed through locking holes 104, 72 for purposes of locking the valve in this position.

It should again be noted that the particular arrangement shown in the Figures as applied to a ball valve presents a locking device where there is a minimum of overhang or protruding component parts. This feature helps prevent and eliminate undesired snags on clothing, personnel or interference in actual installation.

While the subject operating member or handle locking device has been described with reference to a generally conventional 90° ball valve structure, it will be appreciated that other valve types as well as other structures and apparatus having a rotatable operating member could also utilize the subject device. While some modifications to the subject locking device may be necessary for adapting it to a specific apparatus or operational environment, the above description of the preferred embodiment is deemed sufficient to permit those skilled in the art to practice the concepts of the subject invention.

The invention has been described with reference to the preferred embodiment of the invention. Obviously, modifications and alterations in addition to those specifically discussed will occur to others upon the reading and understanding of the specification. It is our intention to include all such modifications and alterations insofar as they come within the scope of the appended claims or the equivalents thereof.

Having thus described our invention, we now claim:

1. A locking structure for controlling apparatus of the type having an apparatus housing with an operating member protruding outwardly from said housing, said operating member being rotatable relative to said apparatus housing between two extreme positions for adjusting said apparatus, said locking structure comprising:

a separate lock plate having a mounting portion and a locking portion, said lock plate being rigidly mounted to said apparatus housing by said mounting portion with said locking portion disposed in a plane generally normal to the longitudinal axis of said operating member, said locking portion having at least first and second spaced apart locking holes therein; and, a lock tab having a body portion and a tab portion, said body portion having a mounting opening therein adapted to be closely received over said operating member, said tab portion extending outwardly of said body portion in a plane generally parallel and closely spaced to the plane of said lock plate locking portion and including a third locking hole therein adapted for selective registry with said first and second locking holes whereby a locking member may be passed through one of the aligned combinations of said third and first and said third and second locking holes for locking said operating member in a particular position with said first and second locking holes being spaced apart such that registry with said third locking hole occurs at said two extreme positions, said body portion of said lock tab including positive stop members adapted to engage said apparatus housing for determining said extreme positions, said positive stop members comprising a pair of spaced apart downwardly depending members with one of said members engaging said apparatus housing in one extreme position of said operating member and the other of said pair engaging said apparatus housing at the other extreme position of said operating member.

2. The locking structure as defined in claim 1 wherein said lock tab is constructed from sheet metal with said downwardly depending members integrally formed with said lock tab body portion and bent downwardly therefrom, the areas of bend of each of said members being disposed generally normal to that portion of said apparatus housing engaged thereby at said one and said other extreme positions.

3. The locking structure as defined in claim 1 further including handle means having a mounting opening therein adapted to be closely received over said operating member for rotating said operating member.

4. The locking structure as defined in claim 3 wherein said handle means extends in generally the opposite direction from said tab portion of said lock tab.

5. The locking structure as defined in claim 1 wherein said controlling apparatus comprises a valve with said operating member being selectively rotatable between valve opened and valve closed positions for controlling fluid flow therethrough, said valve having a valve body which comprises said apparatus housing with said operating member protruding outwardly therefrom, said lock plate mounting portion having mounting holes therein adapted to receive fastening members for rigidly affixing said lock plate to said valve body, said lock plate mounting and locating portions being relatively disposed so that said locking portion extends outwardly of said operating member in a plane generally normal to the longitudinal axis of said operating member.

6. The locking structure as defined in claim 5 wherein said valve comprises a ball valve with the valve body having a central portion and opposed end portions with said portions being retained in an end to end relationship by a plurality of elongated connecting bolt members spaced around said portions generally parallel to each other and normal to the longitudinal axis of said operating member, said mounting holes in said lock plate mounting portion registering with and receiving a pair of said connecting bolt members therethrough for affixing said lock plate to said ball valve.

7. The locking structure as defined in claim 6 wherein said central portion of said valve body includes a longitudinal outwardly extending rib having opposed side walls with said operating member extending outwardly through said rib, said downwardly depending stop members being disposed on opposite sides of said rib with said one stop member engaging one of said rib side walls in said one extreme position of said operating member and said other stop member engaging the other of said rib side walls in said other extreme position of said operating member.

8. The locking structure as defined in claim 7 wherein said lock tab is constructed from sheet metal with said stop members being formed integrally with said body portion and bent downwardly therefrom, said stop members being positioned on said lock tab such that the area of bend of each stop member is disposed generally normal to the associated rib side wall when it is acting to define its respective extreme position.

9. The locking structure as defined in claim 8 wherein said tab portion of said lock tab extends outwardly from said body portion and bisects the axes of bend of said stop members.

10. The locking structure as defined in claim 7 wherein said extreme positions are disposed apart from each other by 90° of rotation of said operating member with said first and second locking holes being equidistantly spaced apart on opposite sides of the longitudinal axis of said valve.

11. The locking structure as defined in claim 5 further including a handle means for rotating said operating member, said handle means extending in generally the opposite direction from said tab portion of said lock tab.

12. A locking structure for locking the operating member in a ball valve in a particular desired position, said ball valve having a central portion and opposed end portions with said end portions being retained in an end to end relationship by a plurality of elongated connecting bolt members spaced around said portions generally parallel to each other and generally parallel to the longitudinal axis of said portions, said operating member protruding outwardly from said central portion and being selectively rotatable relative thereto between two extreme positions defining a first valve opened position and a second valve closed position for controlling fluid flow through said valve, said locking structure comprising:

a separate lock plate having a mounting portion and a locking portion, said mounting portion having mounting holes therein registering with and receiving a pair of said connecting bolt members therethrough for rigidly affixing said lock plate to said ball valve, said lock plate mounting and locking portions being relatively disposed so that said locking portion extends outwardly of said operating member in a plane generally normal to the longitudinal axis thereof, said locking portion having at least first and second spaced apart locking holes therein; and, a lock tab having a body portion and a tab portion, said body portion having a mounting opening therein adapted to be received over said operating member, said tab portion extending outwardly of said body portion in a plane generally parallel and closely spaced to the plane of said lock plate portion and including a third locking hole therein adapted for selective registry with said first and second locking holes whereby a locking member can be passed through one of the aligned combinations of said third and first and said third and second locking holes for locking said operating member in a particular position, said first and second locking holes being spaced apart such that registry with said third locking hole occurs at said two extreme positions, said body portion of said lock tab including positive stop members adapted to engage said body central portion for determining said extreme position, said positive stop members comprising a pair of spaced apart downwardly depending members with one of said members engaging said central portion in one extreme position of said operating member and the other of said pair engaging said central portion at the other extreme position of said operating member.

13. The locking structure as defined in claim 12 wherein said central portion of said valve body includes a longitudinal outwardly extending rib having opposed side walls with said operating member extending outwardly through said rib, said downwardly depending stop members being disposed on opposite sides of said rib with said one stop member engaging one of said rib side walls in said one extreme position of said operating member and said other stop member engaging the other of said rib side walls in said other extreme position of said operating member.

14. The locking structure as defined in claim 13 wherein said lock tab is constructed from sheet metal with said stop members being formed integrally with said body portion and bent downwardly therefrom, said stop members being positioned on said lock tab such that the area of bend of each stop member is disposed generally normal to the associated rib side wall when it is acting to define its respective extreme position.

15. The locking structure as defined in claim 13 wherein said extreme positions are disposed apart from each other by 90° of rotation of said operating member with said first and second locking holes being equidistantly spaced apart on opposite sides of the longitudinal axis of said ball valve central and end portions.

* * * * *